United States Patent [19]

Birchall et al.

[11] 4,010,294

[45] Mar. 1, 1977

[54] COMPLEX PHOSPHATES

[75] Inventors: James Derek Birchall; John Edward Cassidy; Nicholas Rolfe; Clifford Granville Miles, all of Runcorn, England

[73] Assignee: Imperial Chemical Industries Limited, London, England

[22] Filed: Apr. 24, 1975

[21] Appl. No.: 571,320

Related U.S. Application Data

[62] Division of Ser. No. 296,985, Oct. 12, 1972, Pat. No. 3,899,342.

[30] Foreign Application Priority Data

Oct. 19, 1971 United Kingdom ............ 48576/71
June 8, 1972 United Kingdom ............ 26803/72

[52] U.S. Cl. .................................. 427/226; 106/65; 106/85
[51] Int. Cl.$^2$ ............................................ B05D 3/02
[58] Field of Search ................. 427/226; 106/108.5, 106/65, 85

[56] References Cited

UNITED STATES PATENTS

| | | | |
|---|---|---|---|
| 2,219,583 | 10/1940 | Vande Bogart | 106/108.5 |
| 2,425,151 | 8/1947 | Greger | 106/108.5 |
| 2,444,347 | 6/1948 | Greger et al. | 106/108.5 |
| 2,455,758 | 12/1948 | Greger | 106/108.5 |
| 3,342,627 | 9/1967 | Paxton et al. | 427/226 |
| 3,658,563 | 4/1972 | Washio | 106/65 |
| 3,709,723 | 1/1973 | Watanabe et al. | 427/226 |

*Primary Examiner*—Ronald H. Smith
*Assistant Examiner*—Janyce A. Bell
*Attorney, Agent, or Firm*—Cushman, Darby & Cushman

[57] ABSTRACT

Solid water-soluble aluminum phosphate complexes and binder composition which dissolve in water to give solutions containing aluminum ions and orthophosphate ions in such proportions as to provide an Al:P ratio of substantially 1:1 together with the anions of a carboxylic acid or a mineral oxyacid.

15 Claims, No Drawings

COMPLEX PHOSPHATES

This is a division of application Ser. No. 296,985 filed Oct. 12, 1972, now U.S. Pat. No. 3,899,342.

This invention relates to water-soluble solid aluminium phosphate complexes and binder compositions, and to solutions of aluminium phosphate and their use for binding refractory materials and coating surfaces.

The use of acid aluminium phosphates, for example $Al(H_2PO_4)_3$ and $Al_2(HPO_4)_3$, as refractory binders which can be cured by heat is well known. However, these acid binders suffer from the disadvantage that their cured forms can undergo several phase changes at relatively low temperatures, for example temperatures in the range 300° to 800° C. These phase changes are undesirable as they tend to reduce the strength developed by the product on heating.

We have found that, surprisingly, an aqueous solution containing aluminium ions and orthophosphate ions in such proportions as to provide an Al:P ratio of substantially 1:1 together with the anions of a carboxylic acid or a mineral oxyacid can be formed and is effective as a refractory binder which is less liable to the phase changes mentioned above.

Thus there is provided a method of binding refractory solids which comprises forming a slurry or paste containing the solids to be bound and an aqueous solution containing aluminium ions and orthophosphate ions in an Al:P ratio of substantially 1:1 and additionally the anions of a carboxylic acid or a mineral oxyacid, and "curing" the phosphate binder.

Curing the phosphate binder involves removing at least a proportion of the additional anions present so rendering the aluminium phosphate insoluble. This may be effected by heating. The precise temperature is not critical although temperatures of 80° C and more will generally be used. The exact temperature required in any particular case will depend upon the composition of the binder and especially the nature of the additional anions but, in most cases, we find that a temperature in the range 80° to 200° C is sufficient, although higher temperatures may be used if desired.

Alternatively, the binder may be cured in the cold by the use of a setting agent which reacts with the additional acid anions present. Thus the setting agent should be basic, for example magnesium oxide. The use of a cold-setting binder is especially advantageous for the production of monolithic refractories, for example, "castables" (produced by casting a slurry of the binder and a refractory material in a mould) and gunning mixes.

The binder solution contains aluminion ions and orthophosphate ions in such proportions as to provide an Al:P ratio of substantially 1:1, that is 1:0.8 to 1:1.3, preferably 1:0.95 to 1:1.05.

The anions of mineral oxyacids present may be, for example, nitrate anions or sulphate anions. When carboxylic acid anions are present, these are preferably the anions of polycarboxylic acids, for example citric acid and oxalic acid. If desired, a mixture of the anions of more than one acid may be used.

The acid anions should be present in an amount at least sufficient to render the aluminium orthophosphate readily soluble. The amount of acid anions required for this purpose will vary from acid to acid, and will depend on the precise ratio of Al:P present, but will generally be sufficient to provide an anion:Al ratio of at least 0.5:1. Increasing the proportion of the anion present at first increases the solubility of the aluminium phosphate, although after an anion:Al ratio of about 1.2:1 has been exceeded there is generally little further increase in solubility. Since increasing the proportion of anion present will tend to increase the corrosiveness of the binder, there is generally little point in using a solution having an anion:Al ratio of greater than 1.2:1 and we prefer that the anion:Al ratio be in the range 0.7:1 to 1.2:1, although solutions of higher anion:Al ratios, for example 4:1 or 3:1, may be used if desired.

The binder may be prepared in solution by the admixture of aluminium phosphate and the acid containing the desired anions, for example nitric acid, or by the admixture of phosphoric acid with the aluminium salt of the desired anion, for example, aluminium nitrate. Alternatively an aluminium acid phosphate and an aluminium salt of the desired anion may be dissolved in water in the proportions required to provide an Al:P ratio of substantially 1:1.

The binders of the present invention are also available in solid form. This is an important advantage since a solid binder is, in many cases, more convenient to store and transport than a binder solution. Thus our invention also provides a solid water-soluble aluminium phosphate binder which dissolves in water to form a solution containing aluminium ions, orthophosphate ions and additionally the anions of a carboxylic acid or a mineral oxyacid said ions being present in the solution in such proportions as to provide an Al:P ratio of substantially 1:1 and an additional anion:Al ratio in the range 0.5:1 to 1.2:1.

Thus the water-soluble solid binder compositions of the invention contain aluminium and phosphorus in a ratio of substantially 1:1 (that is 1:0.8 to 1:1.3) and preferably in a ratio of 1:0.95 to 1:1.05, and contains the acid anion and aluminium in an anion:Al ratio of 0.5:1 to 1.2:1, preferably 0.7:1 to 1.2:1.

The solid binders of the invention may be prepared by admixing (preferably grinding together) a solid aluminium acid phosphate and an aluminium salt of a mineral oxyacid or a carboxylic acid (or a mixture of two or more such salts) in appropriate proportions to provide the desired Al:P ratio of substantially 1:1, for example, grinding together equimolar proportions of aluminium nitrate, $Al(NO_3)_3$, and aluminium acid phosphate, $Al_2(HPO_4)_3$. Alternatively, the solid binders may be prepared by isolation of a solid from the binder solution by, for example, spray-drying or crystallisation. Surprisingly, we have found that the components of the solid binder form a single complex salt containing chemically-bound water.

Thus, according to a further aspect of the invention there is provided a solid water-soluble complex phosphate of aluminium, containing Al:P in a ratio of substantially 1:1, and containing chemically-bound water and a chemically-bound anion of a carboxylic acid or mineral oxyacid.

The complex phosphates of the invention contain Al:P in a ratio of 1:0.8 to 1:1.3, preferably 1:0.95 to 1:1.05. Examples of the acid anions which may be present in the complex include those given above for the binder solutions. The preferred complexes contain the anion and aluminium in a ratio of anion:Al of 0.8:1 to 1.2:1, although complexes containing smaller or greater proportions of anions are also useful.

The solid complex phosphates may be prepared, as noted above, by making up a solution of the binder (which solution is believed to contain the complexes)

and separating the solid complexes from the solution in known manner, for example by crystallisation or spray-drying. In some cases, for example in the case of the nitrate-containing complex, the complex may be prepared by passing a gaseous precursor of the anion (such as the anhydride of the corresponding acid) over solid aluminium phosphate trihydrate. For example, by passing nitrogen dioxide over aluminium phosphate trihydrate; it is not necessary to heat the reactants and, indeed, it is important that the temperature is not allowed to rise above the decomposition temperature of the complex, that is, about 80° C. On dissolving in water, the complexes of the invention do, of course, provide binder solutions in accordance with the invention.

The binders of the present invention are especially useful for binding refractory materials, for example, silica, alumina, e.g. tabular alumina and bauxite; magnesium, calcium and titanium oxides; zinc and tin oxides; magnesite; mag-chrome grog; zirconium silicate, zirconia; zircon; aluminium silicates, e.g. sillimanite, andalusite, kyanite, mullite and mollochite; porcelain and china clays; carbides, e.g. silicon and tungsten carbide, nitrides, e.g. silicon and boron nitride; boron; asbestos; ferric oxide; chromium oxide; chromite; mica; aluminium phosphate; and mixtures thereof. If a basic refractory material is used, this may also as as a cold-setting agent for the binder.

The binder will generally, but not necessarily, be used in an amount of 1 to 25%, preferably 2 to 10%, by weight, calculated as the solid and based on the weight of material to be bound.

A convenient form for supplying the solid binders of the invention is as a dry mix with the refractory material to be bound. Thus, according to a further aspect of the invention we provide a solid mix comprising a refractory material (especially in granular and/or fibrous form) and a solid binder (preferably in the form of a complex phosphate) in accordance with the invention. If desired, the solid mix may contain a setting agent (as hereinbefore described) for the binder.

The solid mixes of the present invention are useful as refractory mortars and, when they contain a cold-setting agent, for the production of refractory "castables".

The novel complexes and solutions of the invention, by virtue of the fact that they are capable of decomposing to give aluminium phosphate, resemble the halogen-containing complex phosphates of aluminium disclosed in our U.K. Pat. No. 29862/69 (Dutch Pat. No. 7008594). In that, and in subsequent patent applications, we have described the use of the halogen-containing complex phosphates in the binding of solids and the coating of surfaces with aluminium phosphate. In the processes of many of these patent applications the halogen-containing complex phosphates may be replaced partially or wholly by the complex phosphates of the present invention Thus, the complexes and solutions of the invention are useful not only as binding agents but also in the coating of surfaces with aluminium phosphate. Further, apart from the additives mentioned hereinbefore, the compositions and solutions of the complex phosphates according to the present invention may comprise many of the additives disclosed in the patent applications referred to herein.

Examples of processes in which solutions of the invention may be used include:

1. the production of fibres comprising aluminium phosphate:coating substrates, for example of glass, carbon, ceramics or organic polymers with a film of aluminium phosphate as described in Dutch Pat. No. 7,008,594.
2. the coating of surfaces with aluminium phosphate; effects which may be achieved using the coatings on a variety of substrates and particular techniques of applying the coatings are described in Dutch Pat. No. 7,116,975.
3. binding of graphite for example in the manner described in our Dutch Pat. No. 7,116,931.
4. binding inorganic fibres into felted form, for example in the manner described in our Dutch Pat. No. 7,116,974.
5. coating of strengthened glass, for example in the manner described in our Dutch Pat. No. 7,111,112.
6. the preparation of high surface area aluminium phosphate gels by removal of the additional anions from the solution in a controlled manner, for exaple by warming or by the addition of a base. The resultant gels are useful as catalysts or catalyst supports in, for example, cracking reactions.
7. the coating of mould surfaces (especially moulds for casting metal or glass) in the manner described in our Dutch Pat. No. 7,109,014.
8. binding refractory materials to produce casting moulds, for example in the manner described in our Dutch Pat. No. 7,103,318.

The invention is illustrated but not limited by the following Examples in which all parts and percentages are by weight unless otherwise stated:

EXAMPLE 1

Aluminium nitrate (335g) was dissolved in water (1 liter) and 57 ml of 88% orthophosphoric acid were added. The solution was heated in a water bath to give a white water-soluble solid, which was found to have the following composition:

| Al : 12.3%; | $PO_4$ : 43.3%; | $HNO_3$ : 22.2%; | $H_2O$ : 22.5% | corresponding to a molecular ratio of:

| Al : 1; | P : 1; | $NO_3$ : 0.77; | $H_2O$ : 2.74 |

EXAMPLE 2

Aluminium phosphate trihydrate (3.6g) was placed in a 500 ml flask filled at room temperature and atmospheric pressure with nitrogen dioxide gas. The flask was shaken for 15 minutes during which time the temperature of the solid rose to 35° C and then cooled down. The pressure in the flask fell by 16 mm Hg. The resultant product was a white free-flowing solid which was soluble in water and on analysis was shown to have the following composition:

| Al : 13.5%; | $PO_4$ : 45.7%; | $NO_2$ : 11.9%; | $H_2O$ : 36.8% | corresponding to a molecular ratio of:

Al : 1;  P : 0.96;  NO₃ : 0.52;  H₂O : 4.08

The product was subjected to differential thermal analysis. Two main peaks were observed: a weak endothermic peak centred on 60° to 70° C and a strong endothermic peak centred on 160° to 170° C. The latter decomposition takes place over a fairly broad range of 125° to 275° C.

EXAMPLE 3

312g of aluminium nitrate nonahydrate and 93g of 88% orthophosphoric acid were dissolved in 94 ml of distilled water. The resultant solution was spray-dried using a co-current spray-drier with the chamber at atmospheric pressure. The drying gas, which was air, had an inlet temperature of 170° C and an outlet temperature of 80° C.

The solid product formed formed was highly soluble in water and had the following analysis:

|            | Al   | NO₃  | PO₄  | H₂O  |
|------------|------|------|------|------|
| % by weight | 10.8 | 23.5 | 30.6 | 26.1 |
| proportion  | 1.00 | 1.04 | 0.94 | 3.6  |

The infra-red spectrum of the solid product was measured using a pellet formed by compressing a sample of the product with potassium bromide. The following absorptions were observed:

| 3400 cm⁻¹ | very strong, broad |
| 1630 cm⁻¹ | strong |
| 1382 cm⁻¹ | strong |
| 1130 cm⁻¹ | very strong, broad |
| 925 cm⁻¹  | medium |
| 825 cm⁻¹  | weak |
| 530 cm⁻¹  | medium |

The absorptions at 3400 cm⁻¹ and 1630 cm⁻¹ are characteristic of water; the absorptions at 1130 cm⁻¹ and 925 cm⁻¹ are characteristic of phosphate; the absorptions at 1382 cm⁻¹ and 825 cm⁻¹ are characteristic of nitrate.

EXAMPLE 4

An aqueous solution of aluminium nitrate nonahydrate (2410g) and 88% orthophosphoric acid (615g) was prepared. The resulting solution contained approximately 40% by weight of Al(NO₃)₃ and H₃PO₄ taken together.

The solution was spray-dried as in Example 3 at an inlet temperature of 235°–240° C and an outlet temperature of 85°–90° C. The product, which was highly soluble in water, had the following analysis:

|            | Al   | NO₃  | PO₄  | H₂O  |
|------------|------|------|------|------|
| % by weight | 12.1 | 25.7 | 36.5 | 25.3 |
| proportion  | 1.00 | 0.91 | 0.84 | 3.1  |

EXAMPLE 5

An aqueous solution of aluminium nitrate/phosphoric acid having the analysis:

|            | Al  | P   | NO₃  |
|------------|-----|-----|------|
| % by weight | 4.5 | 5.2 | 30.9 | was made up and spray-dried as described in Example 3. The inlet temperature was 196° C and the outlet temperature was 81° C. A water-soluble white solid having the following analysis was produced:

|            | Al   | NO₃  | PO₄  | H₂O  |
|------------|------|------|------|------|
| % by weight | 12.1 | 21.7 | 42.4 | 23.8 |
| proportion  | 1.00 | 0.78 | 1.00 | 3.0  |

EXAMPLE 6

A sample of spray-dried complex aluminium phosphate containing nitrate anions and chemically-bound water and having the following analysis:

|            | Al   | PO₄  | NO₃  |
|------------|------|------|------|
| % by weight | 13.3 | 40.2 | 21.6 | was used in the preparation of a mortar having the following formulation:

|  | Parts | Percentage (based on total solids) |
|---|---|---|
| -325 mesh* calcined alumina | 990 | 33 |
| -60 mesh* calcined alumina | 1665 | 55.5 |
| Hywhite alumina clay | 120 | 4 |
| Complex phosphate | 225 | 7.5 |
| Water | 350 | 11.6 |

*British Standard sieve sizes

The mortar was mixed and cast in a half-inch thick slab. The slab was air-dried at room temperature for 7 days, dried at 110° C for 2 days and then fired at 1300° C for one hour.

The slab was cut up to provide a number of test bars. The modulus of rupture of the test bars was measured at various temperatures using an Instron testing machine at a cross-head speed of 0.05 centimeters/minute. The separation of the outer bearers of the three-point loading rig was 8.0 centimeters. The results obtained are shown below:

| Temperature (° C) | Modulus of rupture (Kg/cm²) |
|---|---|
| Room temperature | 392 |
| 200° | 282 |
| 400° | 312 |
| 600° | 339 |
| 800° | 283 |
| 1000° | 294 |
| 1200° | 67.5 |
| 1300° | 31.6 |
| 1400° | 19.1 |

EXAMPLE 7

210g (1 mol) of citric acid monohydrate were dissolved in 144g of cold water. The solution was stirred and 176g (1 mol) of aluminium orthophosphate trihydrate were added. A viscous clear solution was obtained after stirring for 8 hours. This solution could be diluted without causing any precipitation.

Using this solution as the binder, ceramic test pieces were prepared using the following formulation:

| Refractory Mix | | |
|---|---|---|
| Tabular alumina, grade −325 | = | 33⅓ |
| Tabular alumina, grade 28–48 | = | 33⅓ |
| Tabular alumina, grade 8–14 | = | 33⅓ |
| Citric acid/AlPO$_4$ solution | = | 7.5 |
| Water | = | 6 |

All the constituents were mixed together thoroughly and and poured into 4 inch long by ½ inch cross-section moulds. They were allowed to dry at room temperature for several days, and then dried at 110° C for at least 2 days before being fired at 1000° C for 1 hour.

The modulus of rupture for this ceramic mix was found to be 637 lb ft/in$^2$.

EXAMPLE 8

63g (½ mol) of oxalic acid dihydrate were dissolved in 195g of water at 55° C. The solution was stirred and 88g (½ mol) of aluminium orthophosphate trihydrate were added. A clear solution was formed, which was used to prepare ceramic test pieces of the following formulation.

| Refractory Mix | | |
|---|---|---|
| Tabular alumina, grade −325 | = | 33⅓ |
| Tabular alumina, grade 28–48 | = | 33⅓ |
| Tabular alumina, grade 8–14 | = | 33⅓ |
| Oxalic acid/AlPO$_4$ solution | = | 10 |

All the contituents were mixed together thoroughly and poured into 4 inch long by ½ inch cross-section moulds. They were allowed to dry at room temperature for several days, and then at 110° C for 2 days before being fired at 1000° C for 1 hour.

The modulus of rupture for this ceramic mix was found to be 1024 lb ft/in$^2$.

EXAMPLE 9

63.5g (¼ mol) of sulphosalicylic acid dihydrate were dissolved in 96g of water. The solution was stirred and 44g (¼ mol) of aluminium orthophosphate trihydrate were added. After 30 mins a clear pink solution was obtained.

Using this solution as the binder solution, ceramic test pieces were prepared using the following formulation:

| Refractory Mix | | |
|---|---|---|
| Tabular alumina, grade −325 | = | 33⅓ |
| Tabular alumina, grade 28–48 | = | 33⅓ |
| Tabular alumina, grade 8–14 | = | 33⅓ |
| Sulphosalicylic acid/ AlPO$_4$ solution | = | 10 |

The constituents were mixed together thoroughly and poured into 4 inch long × ½ inch cross-section moulds. They were allowed to dry at room temperature for several days, and then dried at 110° C for at least 2 days before being fired at 1200° C for 1 hour.

The modulus of rupture for this ceramic mix was found to be 1119 lb ft/in$^2$.

EXAMPLE 10

176g (1 mol) of aluminium orthophosphate trihydrate were added, with stirring, to 90g of concentrated nitric acid (this amount equivalent to 1 mol of HNO$_3$).

Addition of the aluminium phosphate caused the mix to become very sticky and difficult to stir. When this occurred small volumes of water were added. The final mix, containing 300g of water, was then warmed up to 80° C to give a clear solution.

This solution was used as the binder in pressed ceramic specimens prepared from the following formulation:

| Tabular alumina, grade −325 | = | 33⅓ parts |
|---|---|---|
| Tabular alumina, grade 28–48 | = | 33⅓ parts |
| Tabular alumina, grade 8–14 | = | 33⅓ parts |
| Binder solution as above | = | 12 parts |

The above constituents were thoroughly mixed and then left to dry for 1 hour to remove excess moisture. 1 inch diameter cylindrical specimens were pressed in moulds at a pressure of 3 tons. The specimens were dried for 16 hours at 120° C and then fired at 1400° C for 1 hour. The compressive strength of the specimens was found to be 2,510 lb/sq.in.

What we claim is:

1. A solid water-soluble aluminium phosphate binder which dissolves in water to form a solution containing aluminium ions, orthophosphate ions and additionally the anions of a carboxylic acid or a mineral oxyacid said ions being present in the solution in such proportions as to provide an Al:P ratio of substantially 1:1 and an additional anion:aluminium ion ratio in the range 0.5:1 to 4:1.

2. A solid as claimed in claim 1 which when dissolved in water forms a solution containing aluminium and phosphorus in a ratio of 1:0.95 to 1:1.05.

3. A solid as claimed in claim 1 in which the additional anions are nitrate anions.

4. A solid as claimed in claim 1 which when dissolved in water forms a solution containing additional anions: aluminium ions in a ratio in the range 0.5:1 to 1.2:1.

5. A solid as claimed in claim 4 which when dissolved in water forms a solution containing additional anions: aluminium ions in a ratio in the range 0.7:1 to 1.2:1.

6. An aqueous solution as claimed in claim 5 wherein the additional anions are nitrate anions.

7. An aqueous solution of the solid of claim 1 containing aluminium ions, orthophosphate ions and additionally the anions of a carboxylic acid or mineral oxyacid, the ions being present in such proportions as to provide an Al:P ratio of substantially 1:1 and an additional anion:aluminium ion ratio in the range 0.5:1 to 4:1.

8. A solid water-soluble complex phosphate of aluminium, containing Al:P in a ratio of substantially 1:1, and containing chemically-bound water and an additional chemically-bound anion of a carboxylic acid or mineral oxyacid, the additional anion: aluminium ion ratio being in the range 0.5:1 to 4:1.

9. A complex phosphate as claimed in claim 8 containing a chemically-bound nitrate anion.

10. A complex phosphate as claimed in claim 8 which contains the additional anion and aluminium in a ratio of 0.7:1 to 1.2:1.

11. A method of preparing a complex phosphate as claimed in claim 8 which comprises preparing an aqueous solution containing aluminium ions, orthophosphate ions and additionally the anions of a carboxylic acid or mineral oxyacid, the ions being present in such proportions as to provide an Al:P ratio of substantially 1:1 and an additional anion:aluminium ion ratio in the range 0.5:1 to 4:1.

12. A method as claimed in claim 11 wherein the additional anion:aluminium ion ratio in the solution is at least 0.7:1.

13. A method as claimed in claim 11 wherein the additional anion:aluminium ion ratio is not greater than 3:1.

14. A method of preparing a complex phosphate of aluminium as claimed in claim 9 which comprises reacting aluminium phosphate trihydrate with nitrogen dioxide.

15. A method of coating a surface with an aluminium phosphate according to claim 13 which comprises applying to the surface a solution containing aluminium ions, orthophosphate ions and, additionally, the anions of a carboxylic acid or mineral oxyacid, the ions being present in such proportions as to provide an Al:P ratio of substantially 1:1 and an additional anion:aluminium ion ratio in the range 0.5:1 to 4:1 and decomposing the solution, by heating to provide a coating of aluminium phosphate on the surface.

* * * * *